US012691793B2

(12) United States Patent
Meyer

(10) Patent No.: US 12,691,793 B2
(45) Date of Patent: Jul. 28, 2026

(54) SYSTEM AND METHOD FOR ADJUSTING A VEHICLE SEAT

(71) Applicant: Ford Global Technologies, LLC, Dearborn, MI (US)

(72) Inventor: Sebastian Meyer, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 18/530,810

(22) Filed: Dec. 6, 2023

(65) Prior Publication Data

US 2024/0190299 A1     Jun. 13, 2024

(30) Foreign Application Priority Data

Dec. 8, 2022     (DE) ......................... 102022132688.8

(51) Int. Cl.
B60N 2/02          (2006.01)

(52) U.S. Cl.
CPC ......... B60N 2/0233 (2023.08); B60N 2/0273 (2023.08)

(58) Field of Classification Search
CPC ........................... B60N 2/0233; B60N 2/0273; B60N 2210/12; B60N 2/0229; B60N 2/02; B60N 2/0228
See application file for complete search history.

(56) References Cited

U.S. PATENT DOCUMENTS

| | | | | |
|---|---|---|---|---|
| 8,042,868 | B2 | 10/2011 | Sakai et al. | |
| 10,821,925 | B2 | 11/2020 | Wild et al. | |
| 2006/0061315 | A1* | 3/2006 | Schmidt | B60N 2/665 |
| | | | | 297/354.12 |
| 2018/0056816 | A1* | 3/2018 | Kim | B60N 2/0277 |
| 2023/0108864 | A1 | 4/2023 | Huang et al. | |
| 2023/0249588 | A1* | 8/2023 | Bayes | B60K 35/10 |
| | | | | 701/49 |
| 2024/0246456 | A1* | 7/2024 | Zhang | B60N 2/0233 |

* cited by examiner

*Primary Examiner* — Abby Lin
*Assistant Examiner* — Renee LaRose
(74) *Attorney, Agent, or Firm* — Vichit Chea; Price Heneveld LLP

(57) ABSTRACT

A system and method for adjusting a vehicle seat. The system has an electromechanical switch arranged on the vehicle seat and evaluation electronics for evaluating switching-position signals of the switch and for controlling at least one electromechanical actuator of the vehicle seat based on the switching-position signals. In order to enhance a vehicle equipped with at least one electromechanically adjustable vehicle seat, the system has at least one touch sensor arranged on the switch, the set of evaluation electronics being configured to detect, from sensor signals of the touch sensor, whether a person is currently touching the touch sensor, and to control the actuator based on the switching-position signals only when the person touches the touch sensor.

14 Claims, 1 Drawing Sheet

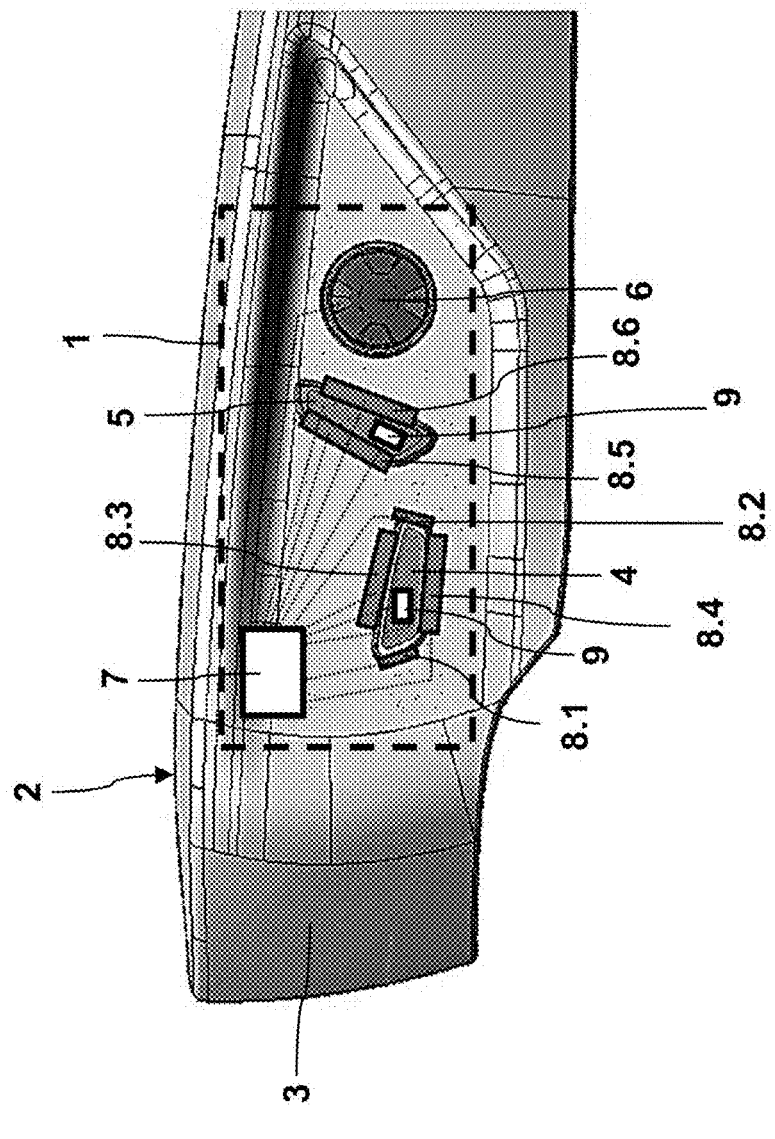

SYSTEM AND METHOD FOR ADJUSTING A VEHICLE SEAT

CROSS-REFERENCE TO RELATED APPLICATION

This application claims foreign priority benefits under 35 U.S.C. § 119(a)-(d) to German Application No. 102022132688.8 filed Dec. 8, 2022, which is hereby incorporated by reference in its entirety.

FIELD OF THE DISCLOSURE

The present disclosure generally relates to vehicle seating and, more particularly, relates to a system and a method for adjusting a vehicle seat.

BACKGROUND OF THE DISCLOSURE

For the purpose of setting an electromechanically adjustable vehicle seat of a vehicle, it is generally known to arrange electromechanical switches such that the actuation of the desired adjustment of the vehicle seat can be performed by a person, on a side of the vehicle seat assigned to the side door of the vehicle that is closest to the vehicle seat.

Electromechanical switches have advantages with regard to haptics and ergonomics if they are located, as is usual, in a region of the vehicle seat that is not visible to a person sitting on the vehicle seat. In addition, by contrast with capacitive switches, they do not require expensive electronics and can be easily operated with a vehicle's electrical power supply.

One drawback with electromechanical switches is that the switches can be inadvertently actuated by some object other than a hand of a user. For example, the switches could be inadvertently actuated in this way if such an object proximate the side door of the vehicle arranged closest to the vehicle seat and/or an interior trim panel arranged thereon moves in the direction of the switches and has thereby come into contact with the switches. This could cause the vehicle seat to adjust to a position that is an unselected position for the person sitting on it.

It would be desirable to enhance the efficiency of a vehicle equipped with at least one electromechanically adjustment vehicle seat.

SUMMARY OF THE DISCLOSURE

According to a first aspect of the present disclosure, a system and method for adjusting a vehicle seat includes an electromechanical switch arranged on the vehicle seat, evaluation electronics for evaluating switching-position signals of the electromechanical switch and for controlling an electromechanical actuator of the vehicle seat based on the switching-position signals, and a touch sensor arranged on the electromechanical switch, the evaluation electronics being configured to detect, from sensor signals of the touch sensor, whether a person is currently touching the touch sensor, and to control the electromechanical actuator based on the switching-position signals only when the person touches the touch sensor.

Embodiments of the first aspect of the present disclosure can include any one or a combination of the following features:

evaluation electronics to supply the electromechanical switch with electrical energy only when the person touches the touch sensor;

a touch sensor with at least one of a capacitive sensor, an inductive sensor, an ultrasonic sensor and a fingerprint sensor;

evaluation electronics to detect a fingerprint of the person from sensor signals of the touch sensor to compare the fingerprint with stored fingerprints and to control the actuator in consideration of the switching-position signals only if the detected fingerprint matches a stored fingerprint, and/or to control the actuator to set the vehicle seat according to a stored seat setting assigned to a stored fingerprint if the detected fingerprint matches a stored fingerprint; and a haptic device arranged on the electromechanical switch for generating a haptically perceptible feedback signal.

According to a second aspect of the present disclosure, a system and method for adjusting a vehicle seat includes a vehicle seat with an electromechanical actuator, an electromechanical switch, evaluation electronics for evaluating switching-position signals of the electromechanical switch and for controlling the electromechanical actuator based on the switching-position signals, and a touch sensor arranged on the electromechanical switch, the evaluation electronics being configured to detect, from sensor signals of the touch sensor, whether a person is currently touching the touch sensor, and to control the electromechanical actuator based on the switching-position signals only when the person touches the touch sensor.

Embodiments of the second aspect of the present disclosure can include any one or a combination of the following features:

evaluation electronics to supply the electromechanical switch with electrical energy only when the person touches the touch sensor;

a touch sensor with at least one of a capacitive sensor, an inductive sensor, an ultrasonic sensor and a fingerprint sensor;

evaluation electronics to detect a fingerprint of the person from sensor signals of the touch sensor, to compare the fingerprint with stored fingerprints and to control the actuator in consideration of the switching-position signals only if the detected fingerprint matches a stored fingerprint, and/or to control the actuator to set the vehicle seat according to a stored seat setting assigned to a stored fingerprint if the detected fingerprint matches a stored fingerprint; and a haptic device arranged on the switch for generating a haptically perceptible feedback signal.

According to a third aspect of the present disclosure, a method for adjusting a vehicle seat by an actuation having at least one electromechanical switch arranged on the vehicle seat having an electromechanical actuator of the vehicle seat based on switching-position signals of the electromechanical switch, by detecting from sensor signals of a touch sensor arranged on the electromechanical switch whether a person is currently touching the touch sensor, and by controlling the electromagnetic actuator based on the switching-position signals only when the person touches the touch sensor.

Embodiments of the third aspect of the present disclosure can include any one or a combination of the following features:

a switch supplied with electrical energy when the person touches the touch sensor;

the switch detecting a fingerprint of the person from sensor signals of the touch sensor, comparing the fingerprint with stored fingerprints, and controlling the electromechanical actuator based on the switching-position signals only if the detected fingerprint matches a stored fingerprint, and/or controlling the actuator to set the vehicle seat according to a stored seat setting assigned to a stored fingerprint if the detected fingerprint matches a stored fingerprint; and the switch generating a haptically perceptible feedback signal on the switch during actuation of the electromechanical switch.

BRIEF DESCRIPTION OF THE DRAWING

In the drawing:

FIG. 1 is a schematic side view of a portion of a vehicle seat housing an exemplary embodiment of a system for adjusting the seat.

DETAILED DESCRIPTION OF THE PREFERRED EMBODIMENTS

In the various FIGURES, identical parts are always denoted by the same reference designations, for which reason said parts will generally also be described only once.

FIG. 1 shows a schematic side view of an exemplary embodiment of a vehicle seat having a system 1 for adjusting a vehicle seat 2. Only a plastic side cover 3 of the vehicle seat 2 is shown with a front end and a rear end of the side cover 3 being shown in the plane of the drawing of FIG. 1.

The system 1 has a first electromechanical switch 4 arranged on the vehicle seat 2, or on the side cover 3, for adjusting a seat cushion component of the vehicle seat 2, which is not shown. The seat cushion component may be on the side of which the side cover 3 is arranged. The first electromechanical switch 4 is configured for adjusting the entire vehicle seat 2 in the longitudinal direction of the vehicle. The shape of the first electromechanical switch 4 may be based on the shape of the seat cushion component.

Furthermore, the system 1 has a second electromechanical switch 5 arranged on the vehicle seat 2, or on the side cover 3, for adjusting a backrest, not shown, of the vehicle seat 2. The shape of the second electromechanical switch 5 may be based on the shape of the backrest. The second electromechanical switch 5 is offset to the rear of the first electromechanical switch 4. In addition, the second electromechanical switch 5 is partially offset vertically from the first electromechanical switch 4.

In addition, the system 1 has a third electromechanical switch 6, of circular design, arranged on the vehicle seat 2, or on the side cover 3, and offset to the rear of the second electromechanical switch 5, for adjusting a lumbar support, not shown, arranged on the backrest.

Moreover, the system 1 has a set of evaluation electronics 7 for evaluating switching-position signals of the first, second and third electromechanical switches 4, 5 and 6 and for controlling at least one electromechanical actuator, not shown, of the vehicle seat 2 in consideration of the switching-position signals.

The system 1 has four touch sensors 8.1, 8.2, 8.3 and 8.4 arranged on the switch 4, and two touch sensors 8.5 and 8.6 arranged on the second electromechanical switch 5. One touch sensor 8.1 is arranged on the front side of the first electromechanical switch 4, and a further touch sensor 8.2 is arranged on the rear side. The touch sensors 8.1 and 8.2 are touched when a person wishes to adjust the vehicle seat 2 as a whole in the longitudinal direction of the vehicle, which is not shown.

The touch sensor 8.1 that is at the front in the plane of the drawing is touched when the vehicle seat is to be moved forward in the longitudinal direction of the vehicle, and the touch sensor 8.2 that is at the rear in the plane of the drawing is touched when the vehicle seat is to be moved rearward in the longitudinal direction of the vehicle. On the first electromechanical switch 4, there is a further touch sensor 8.3 arranged at the top and a further touch sensor 8.4 arranged at the bottom, these touch sensors 8.3 and 8.4 are touched when a person wishes to raise, lower and/or tilt the seat cushion component of the vehicle seat 2. One touch sensor 8.5 is arranged on the front side of the switch 5 and a further touch sensor 8.6 is arranged on the rear side. The touch sensors 8.5 and 8.6 are touched when a person wishes to adjust a tilt of the backrest of the vehicle seat 2. The respective touch sensors 8.1 to 8.6, may each be a capacitive sensor, an inductive sensor, an ultrasonic sensor or a fingerprint sensor.

The set of evaluation electronics 7 is configured to detect, from sensor signals of the touch sensors 8.1 to 8.6, whether a person is currently touching at least one of the touch sensors 8.1 to 8.6. In addition, the set of evaluation electronics 7 is configured to control the electromechanical actuator of the vehicle seat 2 in consideration of the switching-position signals only when the person touches the respective touch sensors 8.1 to 8.6, and thereby the respective first or second electromechanical switch 4 or 5. In particular, the set of evaluation electronics 7 may be configured to supply the respective first or second electromechanical switch 4 or 5 with electrical energy only when the person touches the respective touch sensors 8.1 to 8.6.

Moreover, the set of evaluation electronics 7 may be configured to detect a fingerprint of the person from sensor signals of the respective touch sensors 8.1 to 8.6, to compare the fingerprint with stored fingerprints and, on the one hand, to control the electromechanical actuator of the vehicle seat 2 in consideration of the switching-position signals only if the detected fingerprint matches a stored fingerprint, and/or, on the other hand, to control the actuator for setting the vehicle seat 2 in accordance with a stored seat setting assigned to a stored fingerprint if the detected fingerprint matches a stored fingerprint.

The system 1 further comprises a haptic device 9, arranged at the switch 4, for generating a haptically perceptible feedback signal on the switch 4, and a haptic device 9, arranged on the switch 5, for generating a haptically perceptible feedback signal on the switch 5. The haptic device 9 may also be controlled by the set of evaluation electronics 7 and may, for example, include a motorized device that applies a force feedback, such as vibration.

According to the disclosure, the system has at least one touch sensor arranged on the electromechanical switch, the set of evaluation electronics being configured to detect, from sensor signals of the touch sensor, whether a person is currently touching the touch sensor, and to control the actuator in consideration of the switching-position signals only when the person touches the touch sensor.

It should be noted that the features and measures cited individually in the description may be combined with each other in any technically appropriate way and present further designs of the disclosure. The description additionally characterizes and specifies the system, vehicle seat and method, in particular, in conjunction with the FIGURE.

The vehicle seat can be adjusted only if the set of evaluation electronics detects that a person is touching the touch sensor, and thereby the electromechanical switch, or as long as the person is so touching the switch. This can better prevent the vehicle seat from being inadvertently actuated by some object other than a hand of a user.

Consequently, with the system according to the disclosure, it is not possible, following such a situation, for the vehicle seat to be adjusted in an uncontrolled manner into position that is an unselected position for a person sitting on it. The electromechanical switch can also be actuated by a user, by touching the touch sensor in order to bring the vehicle seat into a better position.

In the context of the disclosure, an adjustment of the vehicle seat means an adjustment of components of the vehicle seat relative to each other, for example an adjustment of a backrest of the vehicle seat relative to a seat cushion component of the vehicle seat, and vice versa, an adjustment of the vehicle seat as a whole relative to the vehicle, for example a displacement of the entire vehicle seat in the longitudinal direction of the vehicle, or a combination of these types of adjustment.

The electromechanical switch may in particular be arranged on a side of the vehicle seat assigned to the side door of the vehicle that is closest to the vehicle seat. The electromechanical switch is a haptic, or touchable switch, the position of which can be felt by hand without a person sitting on the vehicle seat having to see the region of the switch. To generate the switching-position signals, i.e., electrical signals assigned to the respective switching position of the switch, the switch is supplied with electrical energy. This energy supply may be controlled, by open-loop and/or closed-loop control, for example by use of the set of evaluation electronics. The system according to one embodiment may also have two or more such electromechanical switches, in particular a switch for adjusting the backrest and a switch for adjusting the seat cushion component and the entire vehicle seat.

The touch sensor may be arranged on the outside of the electromechanical switch or partially integrated into the switch. The touch sensor may be connected to the switch in a materially bonded, form-fitting and/or force-fitting manner. To generate the sensor signals, the touch sensor is supplied with electrical energy. This energy supply may be controlled, by open-loop and/or closed-loop control, for example by use of the set of evaluation electronics. The touch sensor is preferably designed in such a way that it detects a touch only when it is touched by a hand, i.e., also by one or more fingers. There may also be two or more such touch sensors arranged on the electromechanical switch.

The touch sensor and/or the set of evaluation electronics may also be used, for example, to realize different functions of the electromechanical switch, so that a small number of switches, or pushbuttons, could be used for a greater number of functions. For example, a first function of the switch could be realized when the touch sensor is touched by a single finger, and a second function could be realized when the touch sensor is touched by two fingers, etc.

The set of evaluation electronics may be realized, following implementation of a corresponding software, by a set of shared vehicle electronics, such as a processor or other processing circuitry, that is present. Alternatively, the set of evaluation electronics may be a separate assembly with corresponding software and a processor or other circuitry that can be installed, for example, on the vehicle seat.

The system according to the disclosure makes it possible to retain an electromechanical switch with all its advantages, without the possibility of the disadvantageous and uncontrolled mis-triggering of the switch described above.

A further aspect of the disclosure is a vehicle seat, in particular a driver's seat or passenger's seat, equipped with the system according to the disclosure. Such an electromechanically adjustable vehicle seat has at least one electromechanical actuator by use of which at least one adjustment function of the vehicle seat can be realized.

According to an advantageous embodiment, the set of evaluation electronics is configured to supply the switch with electrical energy only when the person touches the touch sensor. Accordingly, the switch is in a sense switched off when the touch sensor is not triggered. By use of the touch sensor and the set of evaluation electronics, an electrical power supply to the switch can thus be activated and deactivated in order to prevent an uncontrolled mis-triggering of the switch.

According to a further advantageous embodiment, the touch sensor is a capacitive sensor, an inductive sensor, an ultrasonic sensor or a fingerprint sensor. Such exemplary sensor types make it very easy to distinguish whether the touch sensor is touched by a person or by a vehicle component.

According to a further advantageous embodiment, the set of evaluation electronics is configured to detect a fingerprint of the person from sensor signals of the touch sensor, to compare the fingerprint with stored fingerprints and, on the one hand, to control the actuator in consideration of the switching-position signals only if the detected fingerprint matches a stored fingerprint, and/or, on the other hand, to control the actuator to set the vehicle seat according to a stored seat setting assigned to a stored fingerprint if the detected fingerprint matches a stored fingerprint. This enables an individual use of the system, or of the vehicle seat, in that the set of evaluation electronics uses the detected fingerprint to effect an individual setting of the vehicle seat. According to this embodiment, a conventional memory function can thus be realized with the system without the need for a conventional memory pushbutton. In addition, the fingerprint recognition enables any number of individual seat settings to be stored and called up by touching of the touch sensor. Furthermore, operation of the system by an unauthorized user can be prevented because an unauthorized user's fingerprint is not assigned to a particular stored seat setting. However, if an extreme event is identified by use of sensors that are present, the system can deactivate this protection, allowing services personnel to operate. This deactivation requirement may be stored in the set of evaluation electronics.

According to a further advantageous embodiment, the system has at least one haptic device, arranged on the switch, for generating a haptically perceptible feedback signal. This can provide a haptic feedback to a person sitting on the vehicle seat, for example when an end position or an optimal and/or a stored position is reached. The haptic feedback may be realized, for example, by the generation of a vibration on the electromechanical switch.

A method detects from sensor signals of a touch sensor arranged on the switch, whether a person is currently touching the touch sensor, and the actuator is controlled in consideration of the switching-position signals only when the person touches the touch sensor.

The advantages mentioned above with regard to the system are correspondingly associated with the method. In particular, the system may be used according to one of the above-mentioned designs or according to a combination of at least two of these designs with each other to execute the method.

According to a further advantageous embodiment, the switch is supplied with electrical energy only when the person touches the touch sensor.

According to a further advantageous embodiment, a fingerprint of the person is detected from sensor signals of the touch sensor, the fingerprint is compared with stored fingerprints and, on the one hand, the actuator is controlled in consideration of the switching-position signals only if the detected fingerprint matches a stored fingerprint, and/or, on the other hand, the actuator is controlled to set the vehicle seat according to a stored seat setting assigned to a stored fingerprint if the detected fingerprint matches a stored fingerprint.

According to a further advantageous embodiment, a haptically perceptible feedback signal is generated on the switch during an actuation of the switch.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for adjusting a vehicle seat, the system comprising:
an electromechanical switch arranged on the vehicle seat, the electromechanical switch configured to generate switching-position signals;
evaluation electronics for evaluating the switching-position signals of the electromechanical switch and for controlling an electromechanical actuator of the vehicle seat based on the switching-position signals; and
a touch sensor arranged on the electromechanical switch and configured to generate sensor signals, the evaluation electronics being configured to detect, from the sensor signals of the touch sensor, whether a person is currently touching the touch sensor on the electromechanical switch, and to control the electromechanical actuator based on the switching-position signals only when the person is detected touching the touch sensor on the electromechanical switch.

2. The system according to claim 1, wherein the evaluation electronics is configured to supply the electromechanical switch with electrical energy only when the person touches the touch sensor.

3. The system according to claim 1, wherein the touch sensor is at least one of a capacitive sensor, an inductive sensor, an ultrasonic sensor and a fingerprint sensor.

4. The system according to claim 1, wherein the evaluation electronics is configured to detect a fingerprint of the person from sensor signals of the touch sensor, to compare the fingerprint with stored fingerprints and to control the actuator in consideration of the switching-position signals only if the detected fingerprint matches a stored fingerprint, and/or to control the actuator to set the vehicle seat according to a stored seat setting assigned to a stored fingerprint if the detected fingerprint matches a stored fingerprint.

5. The system according to claim 1, further comprising a haptic device arranged on the electromechanical switch for generating a haptically perceptible feedback signal.

6. A vehicle seat comprising:
an electromechanical actuator;
an electromechanical switch configured to generate switching-position signals;
evaluation electronics for evaluating the switching-position signals of the electromechanical switch and for controlling the electromechanical actuator based on the switching-position signals; and a touch sensor arranged on the electromechanical switch and configured to generate sensor signals, the evaluation electronics being configured to detect, from the sensor signals of the touch sensor, whether a person is currently touching the touch sensor on the electromechanical switch, and to control the electromechanical actuator based on the switching-position signals only when the person is detected touching the touch sensor on the electromechanical switch.

7. The vehicle seat according to claim 6, wherein the evaluation electronics is configured to supply the electromechanical switch with electrical energy only when the person touches the touch sensor.

8. The vehicle seat according to claim 6, wherein the touch sensor is at least one of a capacitive sensor, an inductive sensor, an ultrasonic sensor and a fingerprint sensor.

9. The vehicle seat according to claim 6, wherein the evaluation electronics is configured to detect a fingerprint of the person from sensor signals of the touch sensor, to compare the fingerprint with stored fingerprints and to control the actuator in consideration of the switching-position signals only if the detected fingerprint matches a stored fingerprint, and/or to control the actuator to set the vehicle seat according to a stored seat setting assigned to a stored fingerprint if the detected fingerprint matches a stored fingerprint.

10. The vehicle seat according to claim 6, further comprising a haptic device arranged on the switch for generating a haptically perceptible feedback signal.

11. A method for adjusting a vehicle seat by an actuation of at least one electromechanical switch arranged on the vehicle seat, the method comprising:
controlling an electromechanical actuator of the vehicle seat based on switching-position signals generated by the electromechanical switch;
detecting sensor signals generated by a touch sensor arranged on the electromechanical switch whether a person is currently touching the touch sensor on the electromechanical switch; and
controlling the electromagnetic actuator based on the switching-position signals only when the person is detected touching the touch sensor on the electromechanical switch.

12. The method according to claim 11, further comprising supplying the switch with electrical energy only when the person touches the touch sensor.

13. The method according to claim 11, further comprising:
detecting a fingerprint of the person from sensor signals of the touch sensor;
comparing the fingerprint with stored fingerprints; and,
controlling the electromechanical actuator based on the switching-position signals only if the detected fingerprint matches a stored fingerprint, and/or controlling the actuator to set the vehicle seat according to a stored seat setting assigned to a stored fingerprint if the detected fingerprint matches a stored fingerprint.

14. The method according to claim 11, further comprising generating a haptically perceptible feedback signal on the switch during actuation of the electromechanical switch.

* * * * *